United States Patent
Sasaki

(10) Patent No.: US 6,768,597 B2
(45) Date of Patent: Jul. 27, 2004

(54) MOUNT FOR OPTICAL ELEMENTS

(75) Inventor: Ryota Sasaki, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/390,625

(22) Filed: Mar. 19, 2003

(65) Prior Publication Data

US 2003/0231406 A1 Dec. 18, 2003

(30) Foreign Application Priority Data

Mar. 25, 2002 (JP) .......................................... 2002-082976

(51) Int. Cl.$^7$ ............................. G02B 15/14; G02B 7/02
(52) U.S. Cl. ........................ 359/703; 359/704; 359/823
(58) Field of Search ................................ 359/694, 699, 359/700, 701, 703, 704, 819, 823

(56) References Cited

U.S. PATENT DOCUMENTS 6,064,533 A * 5/2000 Kenin et al. ................. 359/695

6,710,937 B2 * 3/2004 Lee et al. ..................... 359/699

FOREIGN PATENT DOCUMENTS

| JP | 2000-184262 | 6/2000 |
|----|-------------|--------|
| JP | 2001-158364 | 6/2001 |

* cited by examiner

Primary Examiner—Ricky Mack
(74) Attorney, Agent, or Firm—Arnold International; Jon W. Henry; Bruce Y. Arnold

(57) ABSTRACT

A mount for optical elements includes a frame and a holder for holding optical elements such as lenses and/or an image detecting element such as a CCD. The frame and holder are cylindrical. The diameter of an interior screw of the holder is smaller than the diameter of a mating exterior screw of the frame so that backlash between the frame and the holder at the screw connection is substantially eliminated as the frame is rotated relative to said holder to tighten the inner surface of the holder against the outer surface of the frame. In one embodiment, at least one notch extends in a longitudinal direction of the holder to assist in elastic deformation of the holder. In another embodiment, a tightening ring formed in a C-shape is mounted around the exterior surface the holder to constrain elastic deformation outwardly when the screw connection is tightened.

21 Claims, 4 Drawing Sheets

MOUNT FOR OPTICAL ELEMENTS

BACKGROUND OF THE INVENTION

In assembling a mount that aligns optical elements along an axis, such as a lens mount, that includes a plurality of parts, the distance along the axis of the mount from, for example, a lens frame that holds a lens system to a flange or stopper portion of a separate holder may need to be set with high precision. For example, the distance may need to be precisely set in order to locate the image detecting surface of an image detecting element, such as a CCD (charge coupled device). However, that distance may vary from a design value because of the nature of the design and the tolerances in various dimensions of the frame and the holder. For this reason, adjustment of the distance is performed at various assembly steps of the mount, which may be a lens mount as described above.

In a conventional mount for optical elements, such as that disclosed in Japanese Laid-Open Patent Application 2000-184262, the distance to the flange or stopper portion is adjusted by screwing a back focus adjustment ring on a lens holder to which a lens is attached. Rotation of the focus adjusting ring moves an image detecting element along the optical axis of the lens relative to the lens and thus the distance to the flange or stopper that determines the distance to the image detecting surface is adjusted. A coil spring operates between the lens holder and the back focus adjustment ring to remove any backlash in the screw connection.

However, the use of a coil spring for removing backlash as disclosed in Japanese Laid-Open Patent Application 2000-184262, not only requires an added separate element (i.e. the coil spring) but is also disadvantageous in that the bias force exerted by the spring changes with the amount of adjustment. Additionally, in most cases, the back focus adjustment ring is anchored on the lens holder by adhesive, or similar connections, after adjustment. Therefore, further adjustment based on rotation of the back focus adjustment ring and use of the coil spring is impossible, which is also a shortcoming of this solution.

BRIEF SUMMARY OF THE INVENTION

The present invention relates to a mount for optical elements, such as a lens mount, that uses a screw connection between a frame and a holder, such as a lens frame and a lens holder, that allows precision adjustment of the distance from the frame to a flange or stopper that determines the position of another optical element, such as an image detecting element, and that avoids problems of backlash in the screw connection in a simple manner.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Two preferred embodiments of a mount for optical elements of the present invention will now be individually described with reference to the drawings.

Embodiment 1

Figure 1:
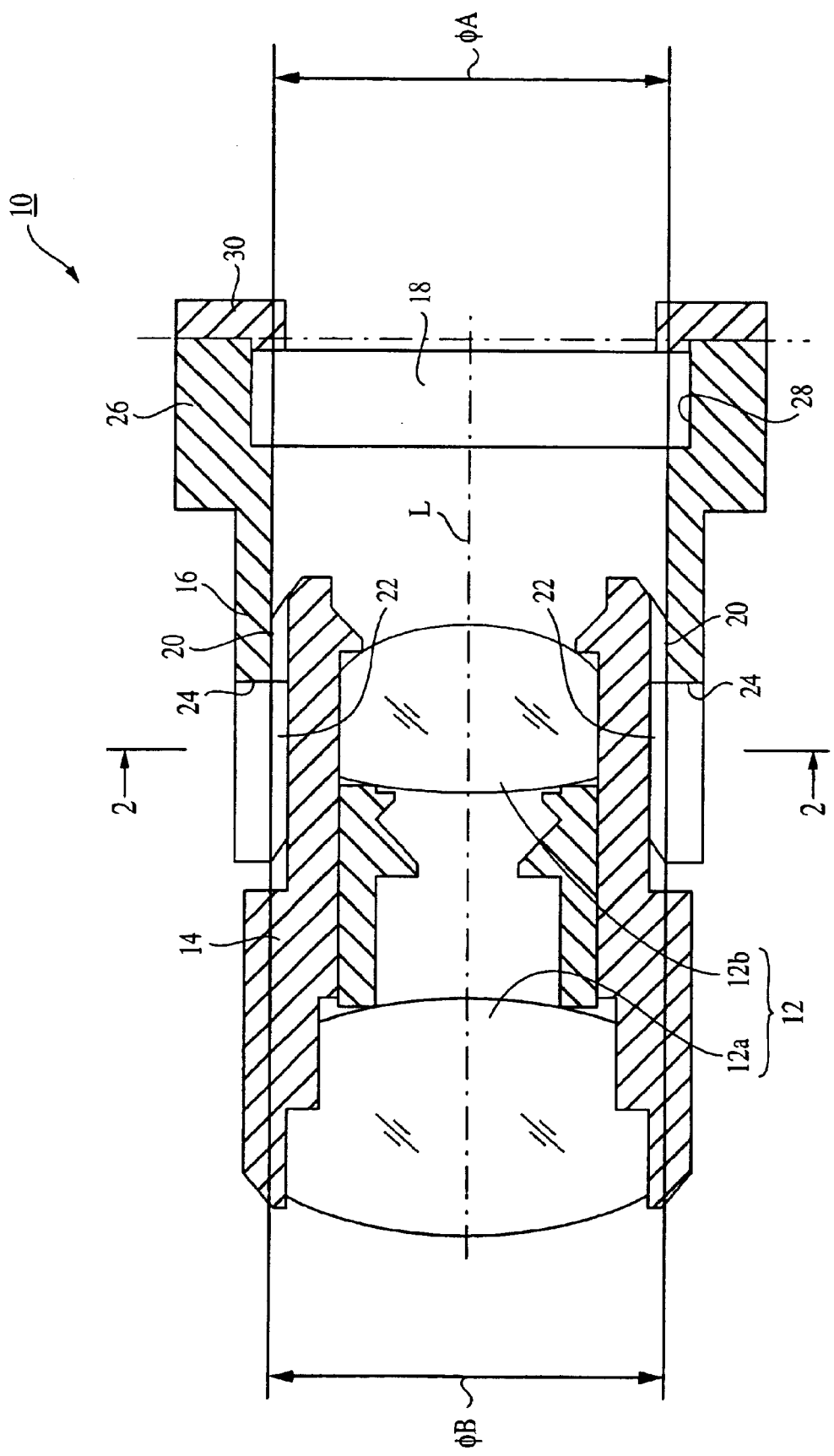
FIG. 1 shows a cross-sectional side view along the longitudinal axis of a mount for optical elements of Embodiment 1 of the present invention.
Figure 2:
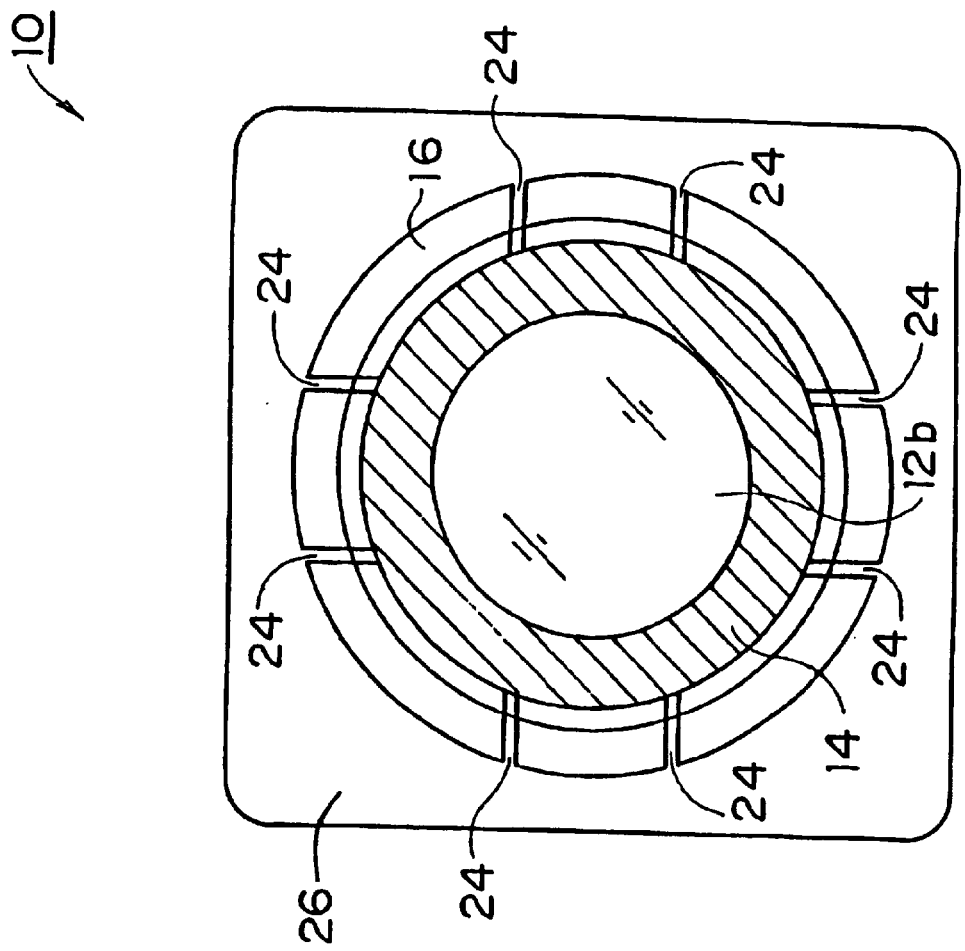
FIG. 2 shows a cross-sectional view of the mount for optical elements of FIG. 1 taken along line 2—2 of FIG. 1.

FIG. 1 is a cross-sectional side view along the longitudinal axis of a mount for optical elements of Embodiment 1 of the present invention, and FIG. 2 is a cross-sectional view of the mount for optical elements of FIG. 1 taken along line 2—2 of FIG. 1. In the specific example of FIGS. 1 and 2, the mount for optical elements is a lens mount that holds a lens system and an image detecting element. As shown in FIG. 1, the lens mount 10 of Embodiment 1 of the present invention includes a lens system 12, a lens holder 16 that holds a lens frame 14, and a CCD 18. The lens system 12 includes a front lens group lens 12a and a rear lens group lens 12b, which are arranged at predetermined intervals inside the lens frame 14.

The lens frame 14 is cylindrical in shape and supports the lens system 12. A male screw 20 is formed on the outer side surface at the rear portion of the lens frame 14.

A lens holder 16 is cylindrical in shape, and a female thread 22, for mating with a male screw 20, is formed along the inner surface of the front tip of the holder 16. As shown in FIG. 2, four sets of two notches, each notch being indicated by the reference symbol 24, are provided at ninety degree internals around the circumference at the front tip of the lens holder 16 where the female thread 22 is formed. Each notch 24 extends from the front tip of the lens holder 16 along the optical axis L beyond the female part 22 with the notch penetrating from the inner surface through the outer surface. The notches 24 allow the front end of the lens holder 16 to elastically deform for expansion or contraction in the radial direction from an external force or pressure.

The lens frame 14 is attached to the lens holder 16 by joining the male screw 20 formed on the outer side surface at the rear portion of the lens frame 14 to the female thread 22 of the lens holder 16. As shown in FIG. 1, the diameter $\phi A$ of the female thread 22 of the lens holder 16 is made to be smaller than the diameter $\phi B$ of the male screw 20 of the lens frame 14 ($\phi A < \phi B$). Hence, when joining the male screw 20 of the lens frame 14 to the female thread 22 of the lens holder 16, the male screw 20 of the lens frame 14 pushes out the female thread 22 of the lens holder 16. On the other hand, the female thread 22 of the lens holder 16 joins the male screw of the lens frame 14 in such a manner that the male screw 20 is tightened by the elastic restoration force of the female thread 22. This eliminates backlash in the screw connection.

The flange 26, which is rectangular in cross-section as shown in FIG. 1, is molded as a part of the outer surface at the rear end of the lens holder 16 and a CCD attachment portion 28 is molded as part of the inner surface of the lens holder 16. Additionally, a CCD anchoring plate 30 is attached to the rear end of the flange 26 of the lens holder 16 with, for example, a bolt (not shown), and the CCD 18 attached to the CCD attachment portion 28 is pressed and anchored between the CCD anchoring plate 30 and an inner flange portion of the lens holder 16.

The assembly of the lens mount 10 of Embodiment 1 of the present embodiment will be described next. As described above, the lens frame 14 is attached to the lens holder 16 by joining the male screw 20 formed on the outer surface of the lens frame 14 to the female thread 22 of the lens holder 16. Because the diameter φA of the female thread 22 of the lens holder 16 is made to be smaller than the diameter φB of male screw 20 of the lens frame 14, the male screw 20 of the lens frame 14 is joined while being tightened by the female thread 22 of the lens holder 16, enabling the attachment of the lens frame 14 to the lens holder 16 without backlash.

Rotation of the lens frame 14 relative to the lens holder 16 results in translation of the lens frame 14 relative to the lens holder 16 along the longitudinal axis of the lens mount 10 to adjust the distance between the rear end of the lens frame 14 and the rear end of the lens holder 16 until a desired back focus distance is achieved. More specifically, with a CCD 18 present, as shown in FIG. 1, the rotation of the lens frame 14 relative to the lens holder 16 results in translation of the lens frame 14 relative to the image detecting surface of the CCD 18 along the optical axis to a position where the image detecting surface of the CCD 18 is at the back focus distance where an in-focus image of a viewed object is present.

The distance of the lens frame from the inner flange portion of the lens holder 16 is adjusted by rotating the lens frame 14 which is attached to the lens holder 16. With rotation of the lens frame 14, the lens frame 14 that is screwed on the lens holder 16 moves back and forth relative to the lens holder 16. The back and forth movement of the lens frame 14 relative to the lens holder 16 causes the lens system 12 that is fixed to the lens frame 14 to move back and forth relative to the CCD 18 attached to the lens holder 16. Therefore, that movement adjusts the distance between the lens system 12 and the image detecting surface of the CCD, that is, the back focus distance. For focusing on distant objects, the back focus distance may be set so that the image detecting surface of the CCD is at a distance from the rear lens surface of the lens system that is equal to the back focal length of the lens system in order to provide in-focus images for the distant objects. Because the lens frame 14 is screwed to the holder 16 with the backlash having been eliminated, positional shifts do not occur during adjustment, enabling accurate adjustment of the back focus distance.

After adjustment of the back focus distance, the lens frame 14 is anchored onto the lens holder 16. For example, an adhesive agent is injected between the male screw of the lens frame 14 and the female thread of the lens holder 16 to anchor the lens frame 14 by adhesion. As described above, the lens frame 14 is joined to the lens holder 16 for relative movement without backlash by the screw connection. Therefore, no shift in position occurs after adjustment and the fixed positional relationship is maintained until the adhesive agent has dried.

In the lens mount 10 of Embodiment 1, because the notches 24 are formed in the lens holder 16, and backlash that might occur in the screw connection between the lens holder 16 and the lens frame 14 is eliminated by using elastic deformation of the lens holder 16, accurate adjustment of the back focus distance is achieved. Additionally, because the use of a separate coil spring is unnecessary, that part is eliminated and the assembly process is simplified. Furthermore, unlike the situation in which a coil spring is used, the problem of changes in tightening power depending on adjustment position is avoided, enabling more certain elimination of backlash.

The values of the width, depth, number, interval, and arrangement of the notches 24 is not limited to those of Embodiment 1, but rather may be changed depending, for example, on the external diameter of the lens holder 16.

Embodiment 2

Figure 3:
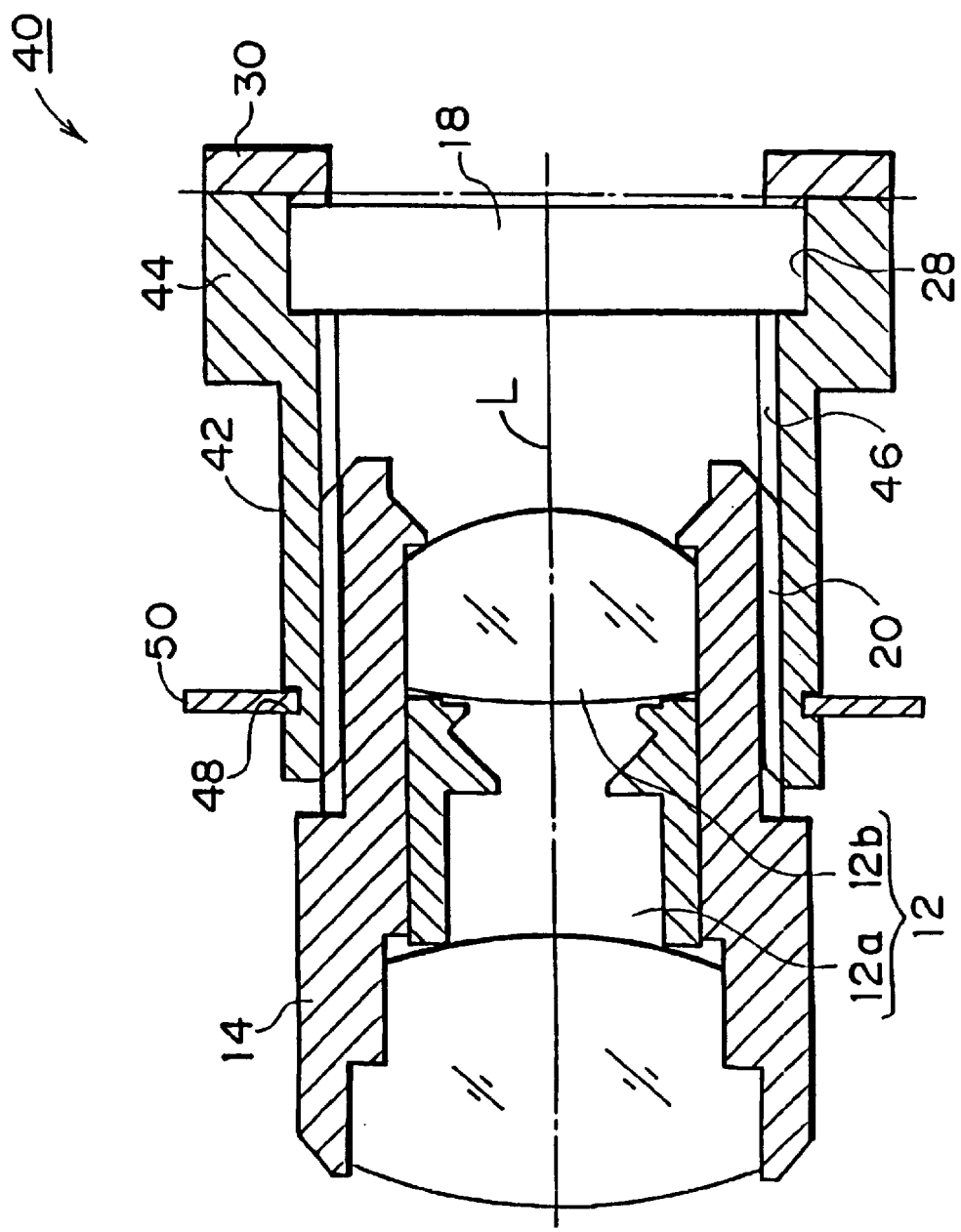
FIG. 3 shows a cross-sectional side view along the longitudinal axis of a mount for optical elements of Embodiment 2 of the present invention.
Figure 4:
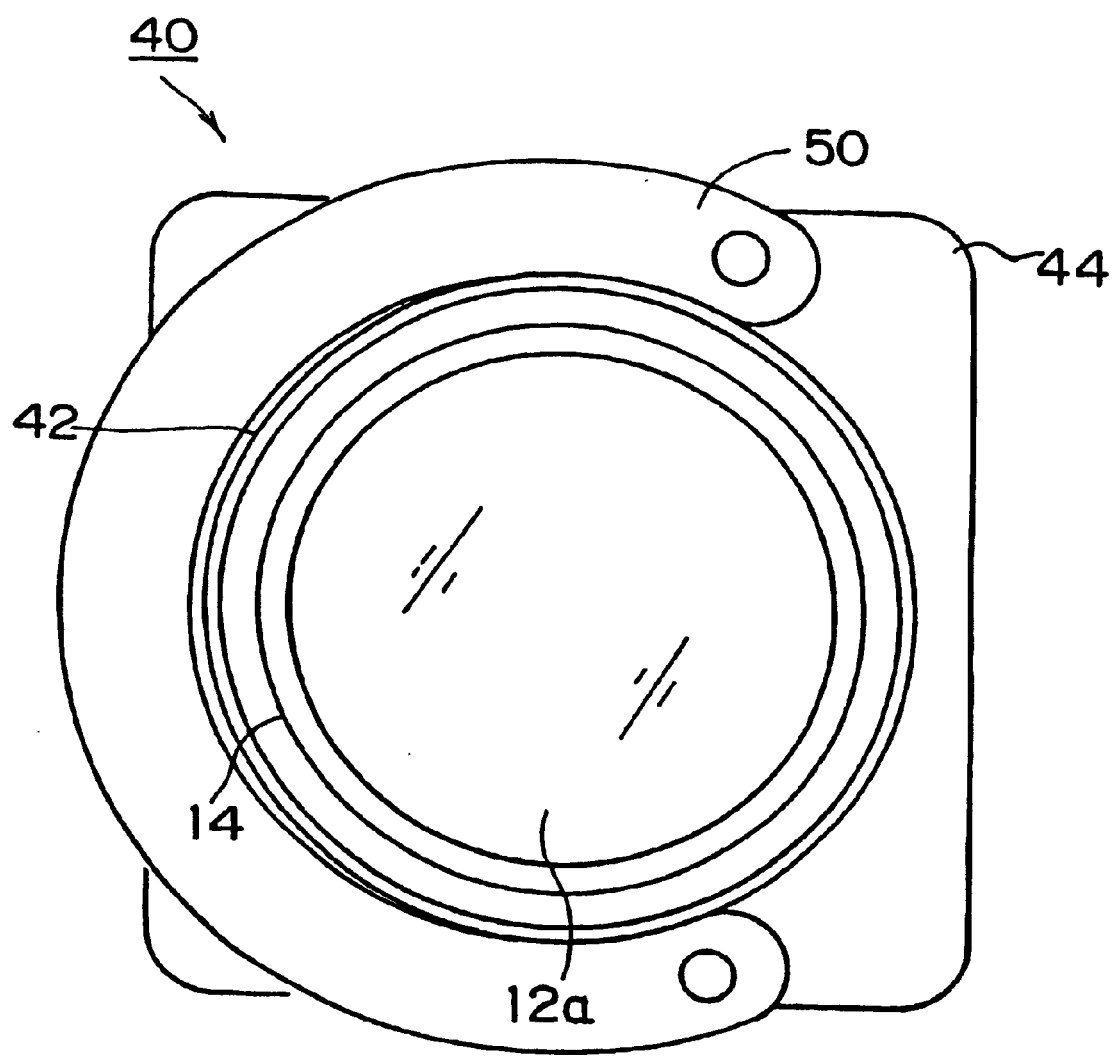
FIG. 4 shows a front view of the mount for optical elements of FIG. 3.

FIG. 3 and FIG. 4 show a cross-sectional side view and a front view, respectively, of a second embodiment of a mount for optical elements of the present invention. As in Embodiment 1, Embodiment 2 is a lens mount that holds a lens system and an image detecting element. The lens frame 14 is the same lens frame as in the lens mount 10 of Embodiment 1. Only the structure of the lens holder differs in Embodiment 2 from that of Embodiment 1. Therefore, in the following description, only the structure of the lens holder is explained and the explanation of other structural elements, which are represented by the same reference symbols as in Embodiment 1, is omitted.

As shown in FIG. 3, the lens holder 42 of the lens mount 40 according to Embodiment 2 of the present invention is cylindrical in shape with a flange 44 that is rectangular in cross-section and that is formed as part of the outer surface at the rear end of the lens holder 42. On the inner surface of the lens holder 42, a female thread 46 is formed for joining with the male screw 20 that is formed on the outer side surface at the rear portion of the lens frame 14.

As shown in FIG. 3, a groove 48 with a predetermined width is formed around the outer surface of the lens holder on the outer peripheral surface at the front portion of the lens holder 42. The groove 48 is formed with a predetermined depth and a tightening ring 50 that is formed in a C-shape is mounted in the groove 48 in such a manner that the tightening ring 50 may be freely removed. The tightening ring 50 is formed with the inner diameter being slightly smaller than the outer diameter of the groove 48 of the lens holder 42. When the tightening ring 50 is attached and inserted in the groove 48, the tightening ring may be tightened against the bottom surface of the groove 48. When the tightening ring is so tightened, the lens holder 42 deforms elastically and the diameter decreases, causing a tight fit between the inner surface of the lens holder 42 and the outer surface of the lens frame 14. This eliminates backlash that might otherwise occur in the screw connection. The tightening ring 50 is mounted around the exterior surface of the cylindrical front portion of the lens holder 42 so that it acts to elastically deform the lens holder 42 inwardly to press the interior surface of the lens holder 42 against the exterior surface of the lens frame 14.

The CCD attachment portion 28 is formed on the inner surface of the lens holder 42 in the same manner as in Embodiment 1 for attachment of a CCD 18. Additionally, the CCD 18 attached to the CCD attachment portion 28 is anchored by the CCD anchoring plate 30 attached to the rear end of the flange 44 of the lens holder 42.

The assembly of the lens mount 40 of Embodiment 2 of the present embodiment will be described next. As described above, when the tightening ring 50 is tightened in the groove 48, which is formed as part of the outer surface at the front end of the lens holder 42, the lens holder 42 deforms elastically, and the diameter of the lens holder 42 decreases. This causes the inner surface of the lens holder 42 to be pushed against the outer surface of the lens frame 14, which eliminates the backlash that might otherwise occur in the screw connection.

Rotation of the lens frame 14 relative to the lens holder 42 results in translation of the lens frame 14 relative to the lens holder 42 along the longitudinal axis of the lens mount 40 to adjust the distance between the rear end of the lens frame 14 and the rear end of the lens holder 42 until a desired back focus distance is achieved. More specifically, with a CCD 18 present, as shown in FIG. 3, the rotation of the lens frame 14 relative to the lens holder 42 results in translation of the lens frame 14 relative to the image detecting surface of the CCD 18 along the optical axis to a position where the image detecting surface of the CCD 18 is at the back focus distance where an in-focus image of a viewed object is present. For focusing on distant objects, the back focus distance may be set so that the image detecting surface of the CCD is at a distance from the rear lens surface of the lens system that is equal to the back focal length of the lens system in order to provide in-focus images for the distant objects.

Adjustment of the back focus distance is performed with the tightening ring 50 tightened, enabling the prevention of any undesired shift between the lens frame 14 and the lens holder 42 during the adjustment. Additionally, after the adjustment of the back focus distance, the lens frame 14 with the tightening ring 50 still tightened is bonded to the lens holder 42, enabling the prevention of shift between the lens frame 14 and the lens holder 42 that might otherwise occur after adjustment. The tightening ring 50 may be removed and recovered from the lens holder 42 after the completion of bonding, enabling reuse of the tightening ring 50.

As described above, in the lens apparatus 40 of Embodiment 2 of the present invention, backlash in the screw connection of the lens holder 42 and the lens frame 14 is prevented by using elastic deformation of the lens holder 42. Therefore, accurate adjustment of the back focus distance is achieved. Additionally, unlike the case in which a coil spring is used, the problem of change in tightening power depending on the adjustment position is avoided. Furthermore, in the lens mount 40 of Embodiment 2 of the present invention, using tightening ring 50, the tightening ring 50 may be recovered and reused after the adjustment of the back focus distance. Therefore, the tightening ring 50 is not wasted. Also, attachment and removal of the tightening ring 50 is easily achieved, simplifying the adjustment operation.

In the present embodiment, the forward end of the lens holder 42 is tightened by mounting the C-shaped tightening ring 50 onto the groove 48. However, other devices for tightening the forward end of the lens holder 42 may be used. In fact, any structure that tightens in the groove 48 may be used. For example, an E-ring or clip may be used to press the groove 48 radially inward so as to tighten the forward end of the lens holder 42. Additionally, the groove 48 is formed with sufficient depth for the elastic deformation of the lens holder 42 in the groove 48 with mounting of the tightening ring 50 in the groove 48. Therefore, the depth of the groove should be determined by considering the tightening force generated by the tightening ring 50. Furthermore, in Embodiment 2 of the present invention, the lens holder 42 is made to deform elastically by mounting the tightening ring 50 in the groove 48 to tighten lens holder 42 against the lens frame 14. However, lens frame 14 may be tightened by elastically deforming the lens holder 42 with the radial application of force or pressure by various devices with or without the presence of a groove 48.

The invention being thus described, it will be obvious that the same may be varied in many ways, including those discussed above. For example, although in the preferred embodiments of the invention a lens system has been shown as mounted in a lens frame, other optical elements, including prisms, filters, diaphragms, light integrators, optical elements with reflective surfaces, and diffractive optical elements, and combinations of the above listed optical elements, may be mounted in the frame. Similarly, although in the preferred embodiments an image detecting element, in particular, a CCD, has been shown as mounted in the lens holder, any of the optical elements mentioned above, or combinations of those optical elements, might also be mounted in the holder, as well as other light processing or light detecting elements that are also optical elements. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A mount for optical elements comprising:

a frame for holding a first optical element and that includes a cylindrical rear portion that has a first screw member on its exterior surface;

a holder for holding a second optical element and that includes a cylindrical front portion that has a second screw member on its interior surface for mating with said first screw member so as to form a screw connection between said frame and said holder so that rotation of said frame relative to said holder results in translation of said frame relative to said holder along a longitudinal axis of the mount to thereby adjust the distance between the rear of said frame and the rear of said holder; and a notch that extends in a direction parallel to said longitudinal axis in said cylindrical front portion, wherein the screw member of said holder is formed with a smaller diameter than the screw member of said frame so that backlash between said frame and said holder at said screw connection is substantially eliminated by rotation of said frame relative to said holder, thereby tightening the inner surface of said holder against the outer surface of the lens frame through elastic deformation of the holder as enhanced by the presence of said notch.

2. The mount of claim 1, wherein said frame holds a lens system that includes at least one lens group.

3. The mount of claim 1, wherein said holder holds an image detecting element.

4. The mount of claim 2, wherein said holder holds an image detecting element.

5. The mount of claim 4, wherein:

said lens system defines an optical axis along said longitudinal axis;

said image detecting element includes an image detecting surface; and the difference in the diameter of the frame screw member and the diameter of the holder screw member is chosen so that a tightening of said screw connection where substantially no backlash is present occurs at a relative position of said frame and said holder along said optical axis where the distance along said optical axis between a rear lens surface of said lens system and said image detecting surface is substantially equal to the back focal length of said lens system.

6. The mount of claim 1, wherein said holder includes a plurality of notches that extend in said cylindrical front portion in a direction parallel to said longitudinal axis.

7. The mount of claim 2, wherein said holder includes a plurality of notches that extend in said cylindrical front portion in a direction parallel to said longitudinal axis.

8. The mount of claim 4, wherein said holder includes a plurality of notches that extend in said cylindrical front portion in a direction parallel to said longitudinal axis.

9. The mount of claim 1, wherein, after relative rotation of said frame and said holder is completed, said frame and said holder are fixed to one another so that relative movement between said frame and said holder cannot occur.

10. The mount of claim 2, wherein, after relative rotation of said frame and said holder is completed, said frame and said holder are fixed to one another so that relative movement between said frame and said holder cannot occur.

11. The mount of claim 4, wherein, after relative rotation of said frame and said holder is completed, said frame and said holder are fixed to one another so that relative movement between said frame and said holder cannot occur.

12. A mount for optical elements comprising:
 a frame for holding a first optical element and that includes a cylindrical rear portion that has a first screw member on its exterior surface; and
 a holder for holding a second optical element and that includes a cylindrical front portion that has a second screw member on its interior surface for mating with said first screw member so as to form a screw connection between said frame and said holder so that rotation of said frame relative to said holder results in translation of said frame relative to said holder along a longitudinal axis of the mount, to thereby adjust the distance between the rear end of said frame and the rear end of said holder;
wherein
 backlash between said frame and said holder at said screw connection is substantially eliminated by applying radial pressure or force to said holder using an external means that acts to elastically deform said holder inwardly so as to press the interior surface of said holder against the exterior surface of said frame.

13. The mount of claim 12, wherein said external means includes a tightening ring formed in a C-shape that is mounted around the exterior surface of said cylindrical front portion of said holder that applies said radial pressure or force.

14. The mount of claim 12, wherein said frame holds a lens system that includes at least one lens group.

15. The mount of claim 12, wherein said holder holds an image detecting element.

16. The mount of claim 14, wherein said holder holds an image detecting element.

17. The mount of claim 13, wherein said frame holds a lens system that includes at least one lens group.

18. The mount of claim 13, wherein said holder holds an image detecting element.

19. The mount of claim 17, wherein said holder holds an image detecting element.

20. The mount of claim 12, wherein, after relative rotation of said frame and said holder is completed, said frame and said holder are fixed to one another so that relative movement between said frame and said holder cannot occur.

21. A mount for optical elements comprising:
 a frame for holding a first optical element and that includes a cylindrical rear portion that has a first screw member on its exterior surface;
 a holder for holding a second optical element and that includes a cylindrical front portion that has a second screw member on its interior surface for mating with said first screw member so as to form a screw connection between said frame and said holder so that rotation of said frame relative to said holder results in translation of said frame relative to said holder along a longitudinal axis of the mount to thereby adjust the distance between the rear of said frame and the rear of said holder;
 a notch that extends in a direction parallel to said longitudinal axis in said cylindrical front portion; and
 means to eliminate backlash between said frame and said holder by elastically deforming said holder radially.

* * * * *